(12) United States Patent
Moiso et al.

(10) Patent No.: US 8,169,930 B2
(45) Date of Patent: May 1, 2012

(54) COMMUNICATIONS METHOD FOR A PACKET-SWITCHED NETWORK AND NETWORK EMPLOYING THE METHOD

(75) Inventors: Corrado Moiso, Turin (IT); Antonio Manzalini, Turin (IT)

(73) Assignee: Telecom Italia S.p.A., Milan (IT)

( * ) Notice: Subject to any disclaimer, the term of this patent is extended or adjusted under 35 U.S.C. 154(b) by 43 days.

(21) Appl. No.: 12/448,645

(22) PCT Filed: Dec. 29, 2006

(86) PCT No.: PCT/EP2006/012604
§ 371 (c)(1),
(2), (4) Date: Oct. 29, 2009

(87) PCT Pub. No.: WO2008/080429
PCT Pub. Date: Jul. 10, 2008

(65) Prior Publication Data
US 2010/0054142 A1    Mar. 4, 2010

(51) Int. Cl.
*H04L 12/26*    (2006.01)
(52) U.S. Cl. ........ 370/252; 370/254; 370/389; 709/224; 709/238; 709/230
(58) Field of Classification Search ................... 370/252, 370/389, 352, 392; 709/224, 230, 238
See application file for complete search history.

(56) References Cited

U.S. PATENT DOCUMENTS

| | | | |
|---|---|---|---|
| 6,006,264 A | 12/1999 | Colby et al. | |
| 6,172,980 B1* | 1/2001 | Flanders et al. | 370/401 |
| 6,389,023 B1* | 5/2002 | Matsuzawa et al. | 370/395.31 |
| 6,449,647 B1 | 9/2002 | Colby et al. | |
| 6,633,560 B1* | 10/2003 | Tiwari et al. | 370/351 |
| 6,912,570 B1 | 6/2005 | Leavy | |
| 6,970,913 B1 | 11/2005 | Albert et al. | |

(Continued)

FOREIGN PATENT DOCUMENTS

WO    WO 99/06913    2/1999

OTHER PUBLICATIONS

International Search Report dated Oct. 4, 2007, from the European Patent Office in International Application No. PCT/EP2006/012604.

*Primary Examiner* — Ricky Ngo
*Assistant Examiner* — Rasheed Gidado
(74) *Attorney, Agent, or Firm* — Finnegan, Henderson, Farabow, Garrett & Dunner, L.L.P.

(57) ABSTRACT

A communications method for a packet-switched network includes: a) receiving at a routing module operating in a low layer of a layered model defining communications on the network, a packet including an identifier associated to a protocol to be employed at a high layer of the model which is higher than the low layer; b) inspecting the received packet at an inspection module so as to identify the protocol associated to the identifier; c) selecting at a selection module a first device, operating in the high layer associated with the identified protocol; d) sending the packet toward the first device; e) processing the packet by applying at the first device a procedure of the high layer to produce a processed packet; f) sending the processed packet from the first device to the routing module; and g) transmitting the processed packet from the routing module toward the network.

27 Claims, 4 Drawing Sheets

U.S. PATENT DOCUMENTS

| | | | |
|---|---|---|---|
| 2003/0067929 A1* | 4/2003 | Matsuzawa | 370/401 |
| 2004/0039833 A1* | 2/2004 | Ludwig et al. | 709/230 |
| 2004/0202156 A1* | 10/2004 | Fonden et al. | 370/389 |
| 2005/0210147 A1* | 9/2005 | Genety et al. | 709/243 |
| 2006/0023718 A1* | 2/2006 | Joly | 370/392 |
| 2006/0233100 A1* | 10/2006 | Luft et al. | 370/229 |
| 2007/0147363 A1* | 6/2007 | Oswal et al. | 370/389 |

\* cited by examiner

COMMUNICATIONS METHOD FOR A PACKET-SWITCHED NETWORK AND NETWORK EMPLOYING THE METHOD

CROSS REFERENCE TO RELATED APPLICATION

This application is a national phase application based on PCT/EP2006/012604, filed Dec. 29, 2006.

FIELD OF THE INVENTION

The present invention relates generally to packet switched networks and, more specifically, to connectionless networks. Particularly, the present invention refers to application services on IP-based networks.

BACKGROUND OF THE INVENTION

As it is known, in a packet-switched network data are transmitted in discrete units of potentially variable length blocks called packets. Each packet contains not only data but also a header with control information. In a connectionless network the information transfer between users/terminals happens without establishing a logical connection or virtual circuit between those specific users/terminals.

Internet is the most used example of a connectionless packet-switched network which is IP-based. Particularly, an IP-based network employs TCP/IP (Transmission Control Protocol/Internet Protocol) model comprising the so called Internet protocol suite, according to which the communications on the network are described by a five-layers model comprising the following layers: Physical, Data Link, Network, Transport and Application.

Particularly, the Network layer is responsible for the source-to-destination delivery of a packet possibly across multiple networks and the Application or "Service" layer supports the end-user, software or human, in accessing the network resources. The layers of the TCP/IP model can be mapped on the ISO/OSI (International Standard Organization/open Systems Interconnection) seven-layers model.

An IP-based network follows a client-server strategy wherein an application program, the client, running on a local machine, requests a service from another application program, called server and running on a remote machine. Normally, an IP-based network is provided with different known devices such as, routers, switches etc., each operating at different layers of the TCP/IP protocol suite.

IP-based network employing proxies are known. A proxy is a program interposed between a client and a server, which offers a network service to allow clients to make indirect network connections to other network services, by using some protocols of the Application layer of the TCP/IP model (e.g., HTTP, FTP, SIP, etc.). The client sends to the proxy a request and the proxy may perform several actions on the request before routing it to the destination.

Cisco Systems, Inc. has proposed an Application Oriented Networking (AON) platform to be used in network employing TCP protocol. Cisco AON embeds a class of application intelligence into the network to meet the needs for multienterprise security, real time visibility, event-driven messaging, optimized delivery. In accordance with this technology, standard routers are enhanced with supervisor engine or route processor in order to transparently redirect application traffic to the Cisco AON module. AON service logic can then be applied to these messages, which are subsequently forwarded to the destination application.

Document U.S. Pat. No. 6,970,913 describes a method of load-balancing according to which a forwarding agent is implemented in a router of an IP-based network comprising clients, servers and service managers. This document discloses packets exchange between the enhanced routers and the service managers in order to perform load-balancing, i.e. distributing requests to different servers, with the goal of optimizing system performance. The Applicant observes that the service managers described by document U.S. Pat. No. 6,970,913 operate at the network layer of the protocol suite.

Document U.S. Pat. No. 6,912,570 describes a method for dynamically modifying a stateful inspection of data and discloses a router adapted to perform a stateful inspection of packets passing therethrough. As it is known, stateful inspection, also referred to as dynamic packet filtering, is a firewall architecture that works at the network layer. The above indicated document refers to a method that exploits such inspection to enable an enhanced use of Quality of Service (QoS) classification based upon the high level application of the data.

SUMMARY OF THE INVENTION

The Applicant notes that prior art techniques address the simplification of the infrastructures of the Network layer to reach a flat and cost-effective architecture based on packet switching such as, for example, the architectures allowing fixed-mobile communications convergence.

Notwithstanding the above, the prior art techniques do not meet an emerging trend which would lead to the evolution of the Application layer towards horizontal platforms to optimize the development, deployment and delivery of value added services. Examples of value added services are services relating to the access, the control and the fruition of contents on the Internet and services adding authentication and identity information to the requests of such contents.

The Applicant has noticed that the above trend can be met by solving the problem of finding a communication method for packet-switched networks, allowing a flexible inter-working between devices and resources operating at different layers of a layered model used to define and design communications aspects, such as, particularly, the Network layer and the Application layer of the ISO/OSI model.

In accordance with the invention, advantages in connection with the flexibility of the architecture have been obtained with a communications method (500) for a packet-switched network (100), comprising:

a) receiving (504) at a routing module (120), operating in a low layer (NTW) of a layered model defining communications on the network, a packet (P-1) including an identifier associated to a protocol (451) to be employed at a high layer (APL) of said model which is higher than said low layer;

b) inspecting (505) the received packet at an inspection module (130) so as to identify the protocol associated to the identifier;

c) selecting (506) at a selection module (140) a first device (AS1), operating in said high layer, associated with the identified protocol;

d) sending (507) the packet (P-1) towards the first device (AS1);

e) processing (508) said packet by applying at the first device (AS1) a procedure of the high layer to produce a processed packet (P-2);

f) sending (509) the processed packet from the first device to the routing module (120); and g) transmitting (510) the processed packet from the routing module (120) towards the network (100).

Further embodiments of the present invention include a communications method (500):

wherein said high layer may at least be mapped on an Application layer (APL2) of the ISO/OSI model; or wherein said routing module (120) may operate in a Network layer of the ISO/OSI model or can be mapped thereon; or wherein said routing module (120), said inspection module (130) and said selection module (140) may be comprised in a second device (13) operating in the low layer; or wherein said second device may be a network router (13).

In the communications method (500), inspecting (505) the packet may include:

accessing a header (450) of said packet containing said identifier (451);

wherein said packet (P-1) may include an IP-datagram (459) and said identifier (451) may be representative of a service type protocol; or wherein said service type protocol may include at least one of the following: HTTP, HTTPS, SIP, FTP, Telnet, SMTP, POP3, SNMP, SOAP.

In the communications method (500) inspecting (505) the packet may include applying one of the following inspection techniques: Stateful Packet Inspection, Deep Packet Inspection.

The communications method of the present invention, may further include, before applying the procedure, accessing, at the first device (AS1), information included in said packet which triggers (1-160) the application of the procedure.

The communications method (500) of the present invention, may also further include generating (503) at least part of the packet by means of a first terminal (10), and transmitting (502) the at least part of the packet on the network by said first terminal, wherein said packet may include a destination address (454) of a second terminal (20) to which at least a part of the packet has to be delivered; or wherein said packet (P-1) may include data (400) representing at least part of a message in accordance with said protocol; or wherein the first terminal (10) may be a client terminal and the second terminal (20) may be a server terminal.

According to another aspect, the present invention relates to a communications network as defined by a packet-switched network (100; 200) comprising:

at least one processor device (AS1-ASN) operating in a high layer (APL) of a layered model defining communications on said network and configured for applying respective procedures to packets, a routing module (120) operating in a low layer (NTW) of said model which is lower than said high layer, the routing module being adapted to receive the packets (P-1) including a respective identifier (451) of a corresponding protocol to be employed at the high layer (APL);

characterized by further comprising:

an inspection module (130) adapted to inspecting a packet so as to identify the protocol associated to the identifier;

a selection module (140) adapted to selecting, on the basis of said identifier, a first device (AS1) associated with the identified protocol and configured to apply a procedure of the high layer to the packet for producing a processed packet (P-2);

and wherein the routing module (120) is further configured to transmit the packet (P-1) to the selected first device, receive the processed packet and transmit the processed packet on the network.

Particular embodiments of said communications network are defined by a packet-switched network (100):

wherein said high layer may at least be mapped on an Application layer (APL2) of the ISO/OSI model; or wherein the first device (13) may be so as to operate in a Network layer of the ISO/OSI model or can be mapped thereon; or wherein the routing module, the inspection module and the selecting module may be comprised in a second device (13) operating in the low layer; or wherein said second device may be a network router (13).

In the packet-switched network, said first device (AS1) may comprise at least one service module (1-150, 1-151) which is configured to apply the procedure.

In the packet-switched network, said inspecting module (130) may be configured to assess a header (450) of said packet containing said identifier (451);

wherein said packet may include an IP-datagram and said identifier (451) is representative of a service type protocol; or wherein said first device (AS1) may further include a trigger module (1-160) for accessing information included in said packet which triggers (1-160) the at least one service logic module.

The packet-switched network of the present invention, may further include a first terminal (10) for generating (503) at least part of said packet and transmitting the at least part of said packet on the network.

The packet-switched network of the present invention may further include a second terminal (20) to which the packet has to be delivered;

wherein said packet (P-1) may include data (400) representing at least part of a message in accordance with said protocol; or wherein the first terminal (10) may be a client terminal and the second terminal (20) may be a server terminal.

BRIEF DESCRIPTION OF THE DRAWINGS

Further features and advantages of the present invention will emerge more clearly from the following detailed description of preferred embodiments thereof provided by way of example in the accompanying drawings in which.

DESCRIPTION OF PREFERRED EMBODIMENTS OF THE INVENTION

Figure 1:
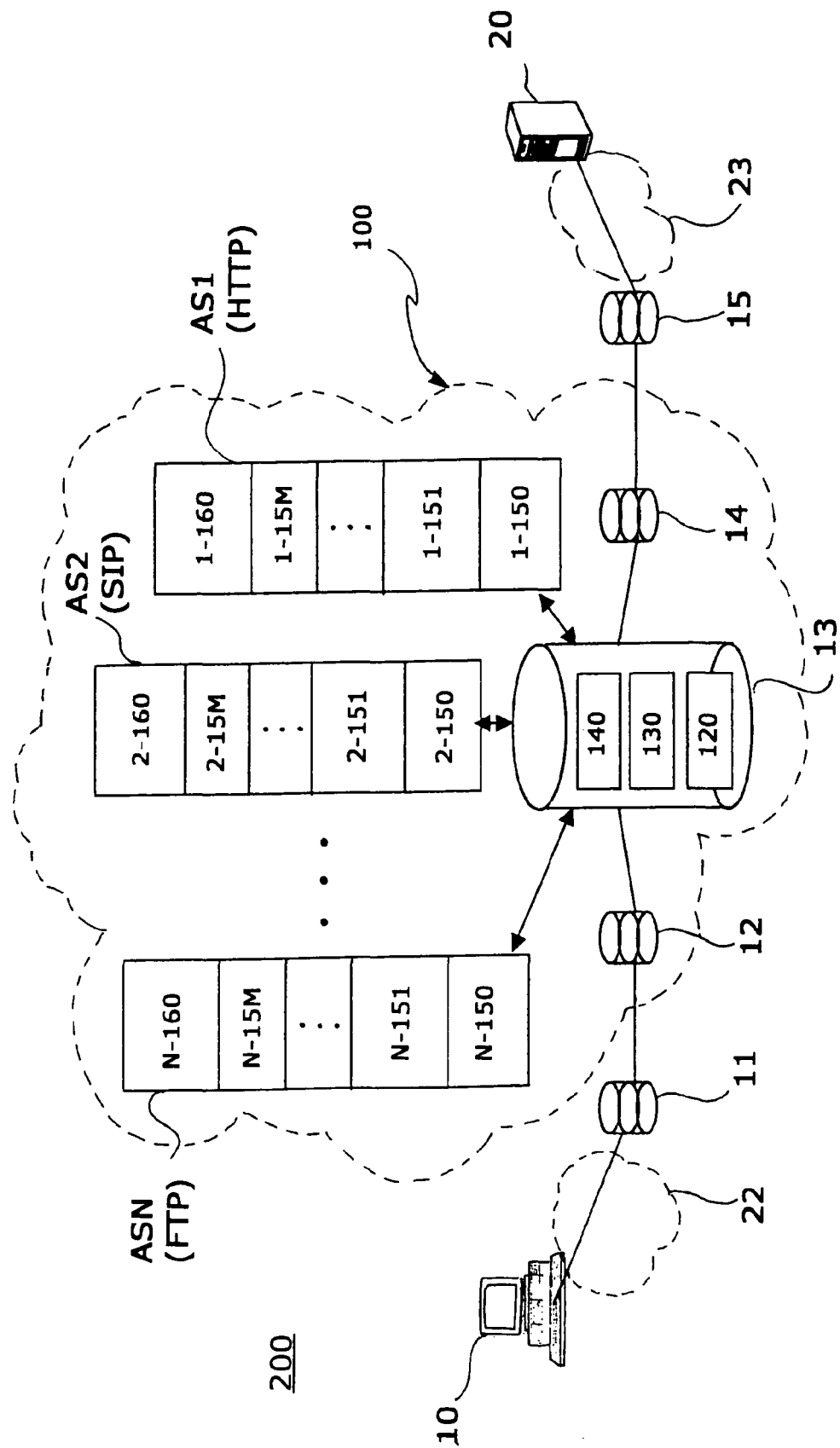
FIG. 1 shows in a schematic form a communications system in accordance with a preferred embodiment of the invention.

FIG. 1 shows an exemplary communications system 200 comprising a first terminal 10, a second terminal 20 and a communications network 100, which allows communication between the first 10 and the second 20 terminals. It is appreciated that the communications system 200 can operate with a different number of terminals.

The communications system 200 is a packet-switched and connectionless network which can be designed and described by means of a layered model defining several ordered, separated but related, layers, each of which defines a segment of the process of moving information across the system.

Figure 2:
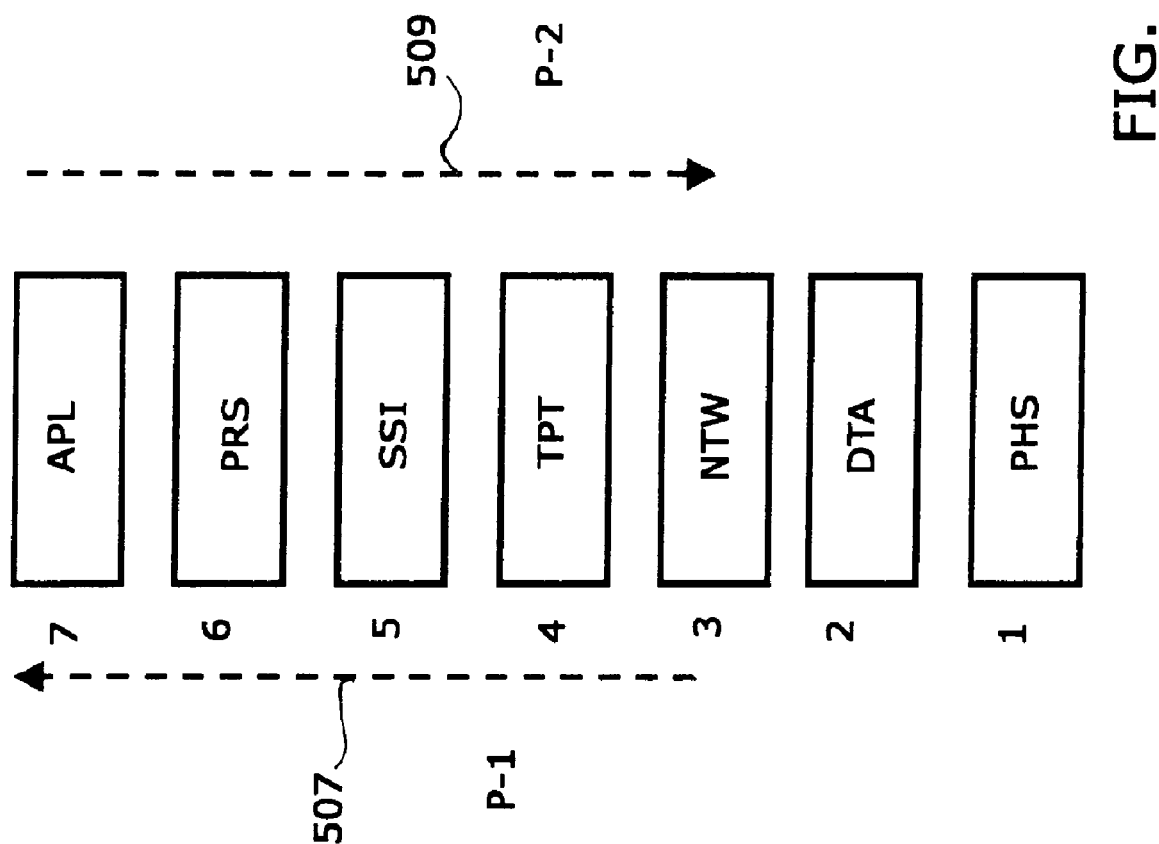
FIG. 2 shows the layers of the ISO/OSI model.

Particularly, the ISO/OSI model can be employed for designing the communications system 200. FIG. 2 shows the known seven layers of the ISO/OSI model: Physical layer 1 (PHS), Data Link layer 2 (DTA), Network layer 3 (NTW), Transport layer 4 (TPT), Session layer 5 (SSI), Presentation Layer 6 (PRS), Application layer 7 (APL).

Each higher layer of the model can be seen as a "client" of the underlying lower "server" layer(s).

Referring still to FIG. 1, in accordance with a preferred embodiment of the invention, the first terminal 10 comprises a computer such as, for example, a client computer provided with suitable hardware and software user interfaces and tools for performing a communication by network 100. First terminal 10 may generate a packets flow and transmit it towards the communications network 100.

Second terminal 20 includes a respective computer such as a server computer (exemplarily, a web server) which may exchange a packets flow with the first terminal 10 via the communication network 100. However, one or both of the first and the second terminals 10 and 20 may be other types of devices such as, for example, telephones allowing fruition of value added IP services.

Communications system 200 includes, for example, a first router device 11 which, as it is known, operates in the Network layer of the above mentioned ISO/OSI model. In accordance with an example, the first router device 11 may route packets flows received from the first terminal 1 via a Local Area Network 22 such as, for example, an Ethernet local network towards the communication network 100.

As an example, communications system 200 also comprises a second router device 15 which may route packets flows between a further LAN 23 (e.g. an Ethernet local network), wherein it is included, the second terminal 20 and the communication network 100. The first 11 and second 15 routers are conventional devices which may be provided with conventional packet switching functionalities. The Ethernet networks 22 and 23 are examples of networks that provide the access to the communications network 100.

Preferably, communications network 100 is an IP-based network such as the Internet which uses the TCP/IP (Transmission Control Protocol/IP) model. As it is known, the layers of the TCP/IP model do not match exactly with those of the ISO/OSI model. In fact, the TCP/IP model is made of five layers: Physical, Data Link, Network, Transport and Application.

However, the Application layer of the TCP/IP model can be mapped on the Session, Presentation and Application layers of the ISO/OSI model.

The following Table 1 indicates some protocols of the Internet protocol suite mapped on the 7-layers ISO/OSI model.

The protocols indicated in Table 1 are:
HTTP: Hyper Text Transfer Protocol; HTTPS: HTTP Secure Socket Layer; SIP: Session Initiation Protocol; FTP: File Transfer Protocol; Telnet: TELetypewriter NETwork, SMTP: Simple Mail Transfer Protocol; UDP: User Datagram Protocol; POP3: Post Office Protocol; SNMP: Simple Network Management Protocol; SOAP: Simple Object Access Protocol; RTP: Real-Time Transport Protocol; FDDI: Fiber Distributed Data Interface; ATM: Asynchronous Transfer Mode.

TABLE 1

| ISO/OSI model | TCP/IP model | Internet protocol suite |
| --- | --- | --- |
| 7-Application | 5-Application | HTTP, HTTS, SIP, FTP, |
| 6-Presentation | | Telnet, SMTP, POP3, |
| 5-Session | | SNMP, SOAP, other |
| 4-Transport | 4-Transport | TCP; UDP; RTP |
| 3-Network | 3-Network | IP |

TABLE 1-continued

| ISO/OSI model | TCP/IP model | Internet protocol suite |
| --- | --- | --- |
| 2-Data Link | 2-Data Link | Ethernet, FDDI, ATM other |
| 1-Physical | 1-Physical | Optical fiber, coaxial cable, other |

The exemplary illustrated communication network 100 comprises a third router device 12 and a fourth router device 14 which route packets flows from/to the first 11 and the second 15 router device, respectively.

Third router device 12 and fourth router device 14 operate in the Network layer of the TCP/IP suite protocol. Moreover, the third 12 and the fourth 14 router devices may operate in the Physical and/or Data Link layers. In greater detail, first, second, third and fourth router devices 11, 15, 12, 14 have access to the Network layer and are provided with software that enables them to determine which of several possible paths is the best for a particular transmission, and relay packets, and look up in corresponding routing tables.

Further, the communication network 100 includes a router device 13 connectable to the third router device 12 and the fourth router device 14.

The router device 13 can be substantially analogous to the above described router devices with reference to the routing functions performed on the received packets. The routing functions of the router device 13 are represented in FIG. 1 by means of a routing module 120.

Figure 3:
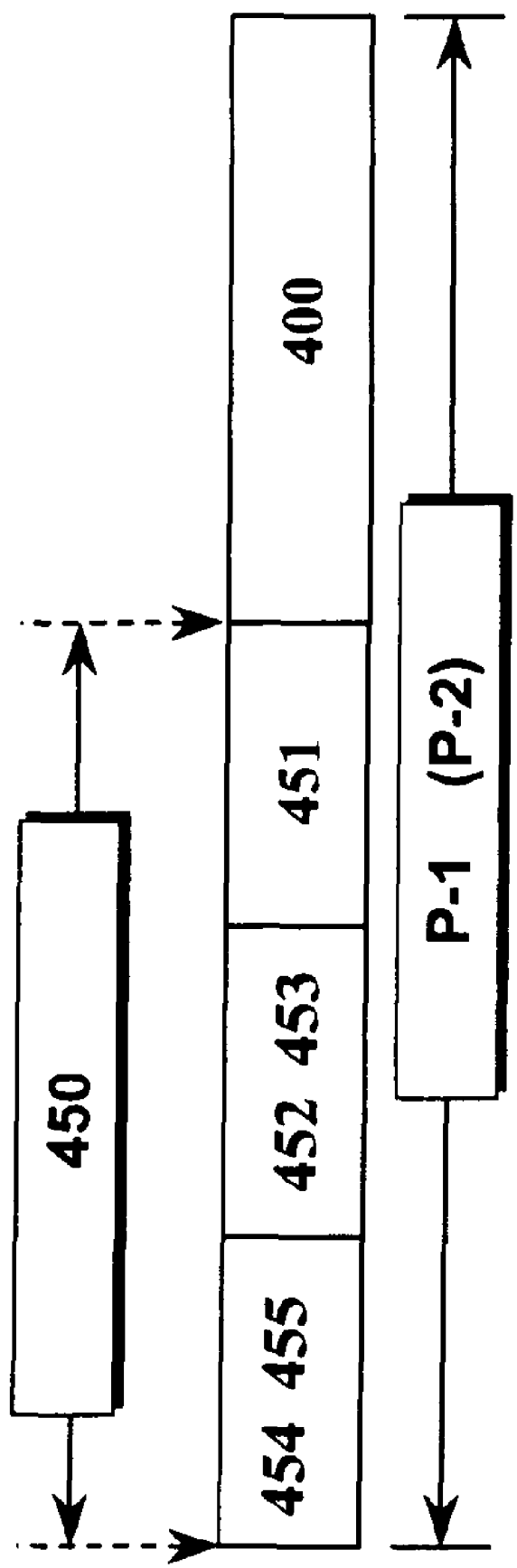
FIG. 3 schematically illustrates a packet including an IP-datagram.

Referring next to FIG. 3, an example of the encapsulation at different layers to form a packet P-1 which can be managed by the router device 13 is shown. The packet P-1, schematically illustrated in FIG. 3, comprises data (or payload) 400 and header 450 and is, in accordance with the example considered, an IP-datagram. Particularly, data 400 contain bits of a message or part of a message which is created in the Application layer, for example, by the first terminal 10. As an example, data 400 are bits representing at least part of a "Get" message of the HTTP application protocol or of an "Invite" message of the SIP application protocol. Typically, a whole message is formed by bits of a plurality of data 400 carried by more packets, each analogous to packet P-1.

Header 450 includes several fields and particularly, it comprises a service type (hereinafter, called, application protocol type) identifier 451, such as bits indicating the protocol of the Application layer employed (e.g. HTTP, FTP or SIP) for encapsulating the data 400. The application protocol type identifier 451 may identify one of the protocols of the Application layer indicated in the above Table 1.

Moreover, header 450 includes a source transport layer port 452 (e.g. the TCP or UDP address of the first terminal 10) and a destination transport layer port 453 (e.g. the TCP or UDP address of the second terminal 20). Header 450 further includes a source network layer address 454 (e.g. the source IP address) and a destination network layer address 455 (e.g., the destination IP address). For example, the source IP address is the Internet address of the first terminal 10 and the destination IP address is the Internet address of the second terminal 20.

Referring still to FIG. 1, in accordance with a preferred embodiment of the invention, router device 13 is able not only to correctly route packets but it is, advantageously, also provided with further functionalities. Particularly, with reference to the exemplary packet P-1, router device 13 includes an inspection module 130, which allows performing an inspection of the packet in order to access at least the application protocol type identifier 451 for identifying the protocol of the Application layer associated to the communication of the data 400.

Inspection module 130 can operate in accordance with, for example, known packet inspection techniques such as the Stateful Packet Inspection (SPI), which is a preferred technique for the present invention, or the Deep Packet Inspection (DPI).

With reference again to FIG. 3, the Stateful Packet Inspection allows to access to the following 5-tuple of header information:
1. Source IP address (454);
2. Destination IP address (455);
3. Source transport layer port (452);
4. Destination transport layer port (453);
5. Application protocol type (451).

Stateful Packet Inspection accesses to those header fields containing information encapsulated at the Network layer (e.g. header 454 and 455) and/or up to the Transport layer (i.e. headers 452, 453 and 451). Moreover, Stateful Packet Inspection can access header information encapsulated at the Data Link layer but it does not access to the information encapsulated at the Application layer, such as data 400.

Deep Packet Inspection allows to access, in addition to the above mentioned 5-tuple, also the information encapsulated at the Application layer, such as data 400, so as to determine not only the application protocol employed but also the actual application that rely on those protocol.

The router device 13 is also provided with a selection module 140 which allows to select among a plurality of processor devices AS1-ASN included in the communications system 100 a specific one which is associated to a protocol of the Application layer identified by the inspection module 130 inspecting a packet received at the router device 13.

It is appreciated that the routing module 120, the inspection module 130 and the selection module 140 are hardware and/or software modules which can, preferably, reside in the router device 13 and include separated and/or shared memories, computer readable codes and processing units suitable for the implementation of the corresponding functions. Particularly, as it is clear for the skilled person, the operations and the procedures performed by the routing, inspecting and selection modules 120, 130 and 140 correspond to computing procedures carried out on bits, data and/or information representing the concerned quantities or parameters.

As mentioned above, the communication network 100 also comprises the plurality of processor devices AS1-ASN, which are, preferably, Applications Servers. Each Application Server AS1-ASN is associated with a least one specific protocol of the Application layer such as, in accordance with the example given, at least one Application protocol of the Internet protocol suite. In accordance with a particular embodiment of the invention, sub-groups of Application Servers AS1-ASN can be associated to the same Application protocol and/or one or more of the Application Servers AS1-ASN can be associated to more than one Application protocol. Each Application Server AS1-ASN can operate in the Application layer for processing a packet in accordance with a procedure or service logic defined for the Application layer.

Particularly, an Application Server is a computer and/or the software thereof which provides infrastructure and functions for supporting, developing and deploying service logics of the Application layer to process messages of the Application layer protocol (hereinafter, also "application protocol message"). Each Application Server AS1-ASN can receive the packets flow corresponding to an application protocol message and processing each packet for accessing data 400, reconstructing the whole message and applying the corresponding service logic to the reconstructed message to produce a further message, to be re-encapsulated under the form of a processed packets flow.

Moreover, with reference also to the packet P-1 shown in FIG. 3, each Application Server AS1-ASN is associated to a single specific application protocol defined by the identifier 451 and, for example: the Application Server AS1 is associated to protocol HTTP; the Application Server AS2 is associated to protocol SIP and the Application Server ASN is associated to protocol FTP. For example the service logics implemented by the HTTP Application server AS1 may refer to access control and/or fruition control of contents on the Internet, or to services adding authentication and identity information to the messages requesting such contents, or to other value added services.

Each Application Server AS1-ASN is provided with respective service logic modules and in particular: the HTTP Application Server AS1 includes service logics modules 1-150, 1-151 and 1-15M; the SIP Application Server AS2 includes service logics modules 2-150, 2-151 and 2-15M and the FTP Application Server ASN includes service logics modules N-150, N-151 and N-15M.

Each of said service logic modules i-15j (i: 1-N; j: 0-M) can apply a specific service logic to a message encapsulated in a flow of packets like packet P-1 of FIG. 3. The service logics applied by each of said service logic module i-15j are defined in the Application layer of the ISO/OSI model or preferably of the TCP/IP model.

Advantageously, each Application Server AS1-ASN is also provided with a corresponding triggering module 1-160, 2-160 . . . , N-160 which can trigger the procedure associated to one of the service logic modules i-15j, according to the content (e.g. one or more fields) of the application protocol message carried by the packet flow. Considerations analogous to the ones made in connection with the hardware and/or software content of the routing module 120, inspection module 130, selection module 140 can be also made for the service logic modules i-15j and the triggering modules 1-160, 2-160 . . . , N-160. Particularly, service logic modules i-15j are provided with the computational and logic tools necessary to fully apply the corresponding service logic.

For the sake of clarity, the IP-based communications system 200 and network 100 have been illustrated in FIG. 1 in schematic manner and only by some of the devices normally employed in such type of network, e.g. the Internet. The skilled person would easy identify other sub-networks (such as, for example, core networks, metro networks and backbone networks), apparatuses and/or devices (such as, for example, core routers, backbone routers, metro routers, Multi-service PoPs, bridge devices, switches devices) to be employed for fully design the network. Preferably, router device 13 is a core router, so as to ensure that considerable packets flows could be managed by said device.

Figure 4:
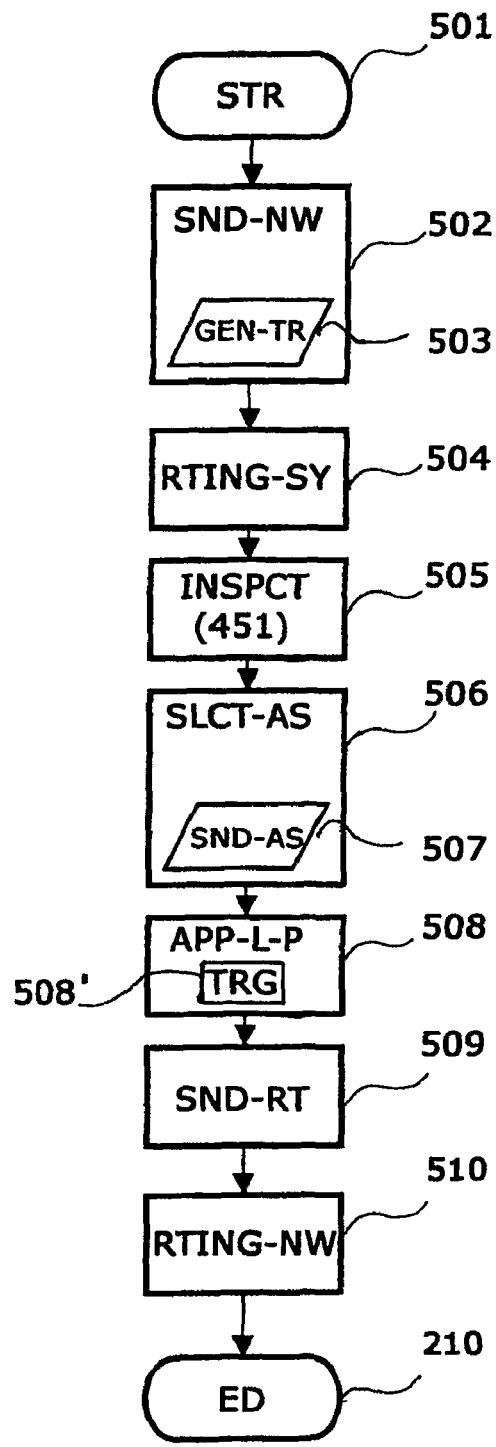
FIG. 4 is a flow diagram illustrating a communications method in accordance with an example of the invention.

An example of a communications method 500 performed on the communication network 200 will be now described with reference to FIG. 4.

The method has a starting step 501 (STR) and a step 502 (SND-NW) of sending on the communication network 100 at least one packet P-1 including the application protocol type identifier 451 which indicates, for example, that protocol HTTP is employed. Particularly, sending step 502 includes a step 503 (GEN-TR) in which the first terminal 10 generates an application protocol message encapsulated in one or more packets analogous to packet P-1, and transmits it towards the communication network 100 by the local network 22.

In accordance with the example given, conventional routing steps 504 (RTING-SY) are then performed by the first router device 11 which receives packets P-1 and route them towards the third router device 12 that, in turn, forwards them to the router device 13.

Moreover, in step 505 the routing module 120 of the router device 13 receives packets P-1 and activates inspection module 130 which performs a packet inspection (INSPCT)—for example, the Stateful Packet inspection—and access the application protocol type identifier 451 identifying the application protocol employed (e.g. HTTP).

Then, the router device 13 activates the selection module 140 starting a selection step 506 (SLCT-AS) wherein, based on the identified application protocol, the associated Application Server among the plurality AS1-ASN is determined. In accordance with the example described, HTTP Application Server AS1 is selected. Router device 13 thus sends (step 507, SND-AS) the packets P-1 towards the selected HTTP Application Server AS1. In FIG. 2, step 507 has been indicated as an arrow that goes from Network layer (3) to the Application layer (7).

In a step 508 (APP-L-P), the HTTP Application Server AS1 receives packets P-1 and starts the processing of each of them applying procedures defined in the Application layer. Particularly, the trigger module 1-160 of the HTTP Application Server AS1 reads the received packets P-1 and reconstructs the application protocol message received. Moreover, on the basis of information carried by the message and encapsulated in packets P-1, the trigger module 160-1 of the HTTP Application Server AS1 selects and triggers (triggering step 508'—TRG) one or more of the service logic modules i-15*j*. As an example, trigger module 1-160 activates service logic module 1-150 when the received packets P-1 carry a pre-established Destination IP address 455 for which an authorization procedure is required.

Thus, the selected service logic module 1-150 acts on packets P-1, for example, modifying the content of the header field 450 and/or modifying the data 400, i.e. the application protocol message carried out by packets P-1. As an example, service logic module 1-150 modifies packets P-1 in such a way to generate a further message formed by processed packets P-2, having a format analogous to packets P-1, but indicating an address of a web page different from the one indicated by packets P-1, in order to show a page requesting authorization credentials to the user.

After this processing of packets P-1, the method includes a step 509 of sending (SND-RT) from the HTTP Application Server AS1 towards the router device 13 the application protocol message resulting from the processing, which is under the form of the plurality of processed packets P-2. In FIG. 2, step 509 as been indicated as another arrow that goes from the Application layer (7) to the Network layer (3).

It is observed that, advantageously, the packets exchange between the Application Server AS1 and the router device 13 does not require the use of intermediate proxies.

In a further routing step 510 (RTING-NW), router device 13 operates, by means of the routing module 120, standard routing of the processed packets P-2 as received from HTTP Application Server AS1 and transmits them on the communication network 100. The path followed by the processed packets P-2 in the communication network 100 depends on the service logic applied by the HTTP Application server. For example, packets P-2 may be transmitted towards fourth router device 14 and second router device 15, and received at the second terminal 20. The method 500 terminates with and end step 210 (ED).

As stated above, the routing operation performed at the routing module 120 on the processed packets P-2 may depend on the service logic applied by the specific selected Application Server AS1-ASN in step 508, since the service logic can modify not only the information carried by data 400 but, alternatively or in addition, also the content of header 450.

In addition, it is appreciated that, alternatively, the inspection module 130 and the selection module 140 can be implemented in devices separated from the routing device 13. Advantageously, communications network 100 or communications system 200 may include more than one device provided with respective inspection modules and selection modules analogous to the modules 130 and 140 above illustrated. Particularly, the communications system 200 and/or the communication network 100 will be, advantageously, provided with a suitable number of router devices implementing the above described inspecting and selecting functions so as to ensure that all the packets flow for which the method in accordance with the invention has to be applied will meet a corresponding router device.

Furthermore, it is noticed that, as above described, a router device enhanced with the inspecting and selecting functions can be associated to several Application Servers and each Application Server can be associated to more than one enhanced router devices.

In accordance with the embodiment of the communication network 100 comprising sub-groups of Application Servers AS1-ASN associated to the same protocol of the Application layer, the selection module 140 of the router device 13 may be configured so as to select one or more Application Servers of the same sub-group for the processing packets P-1, in order to balance a load among the Application Servers of the sub-group and/or increase fault tolerance.

For example, the selection of Application Servers among the same sub-group may be performed by a selection module 140 which implements a deep inspection. According to this embodiment, packets P-1 are forwarded to Application Servers selected also on the basis of the content of data 400 carried by packets P-1 and not only based on the application protocol type identifier 451. Each of the selected Application Servers belonging to the same sub-group behaves in a manner analogous to the one above described with reference to FIG. 4.

It has to be underlined that even if the above description refers to the Application Servers AS1-ASN, the teaching of the invention can be applied also to other type of devices operating in the Application layer of the ISO/OSI model or the TCP/IP model as defined in Table 1. Moreover, alternatively to the router device 13 can be used another device operating in the Network layer of the ISO/OSI model or TCP/IP model.

The teaching of the invention can be also applied to communications network and systems defined and designed by means of different layered models which do not define explicitly a Network layer and an Application layer, and do not define layers which can be easily mapped on the ISO/OSI model. The method of the invention is applicable to communications systems/networks which can be described by a model defining at least devices operating in a high layer and devices operating in a distinct low layer. With the term "device operating in a high layer" is meant a device configured to apply procedures on packets (i.e. service logics) supporting the user in accessing the network resources and/or producing results appreciable for the user. With the term user is meant a human or a software entity who/which benefits from the communication process, such as for example, the human user of the first terminal 10 or an application software running on the first terminal 10 or on the second terminal 20.

Devices operating in the low layer are devices which deal with aspects of the communications system that support the network in the communications process. In general, devices and/or procedures operating at a "high" layer acts as clients of devices and/or procedures operating at a "low" layers (acting as servers).

Now, two examples of the method in accordance with the invention will be described.

In the first example, referring to the HTTP protocol, the user of the first terminal 10 (acting as a client) wants to get a web page on the second terminal 20 (acting as a server) and an authorization service logic has to be applied. Initially, the user writes on a keyboard of the first terminal 10 a URI (Uniform Resource Identifier) of a web-site that he wants to get. As it is known, the URI is employed by the HTTP protocol to access a document on the Internet. A browser application of the first terminal 10 translates such URI into an HTTP message such as, for example:
GET http://www.ietf.org/pub/WWW/TheProject.html HTTP/1.0.
This message, includes the following three parts:
Protocol: HTTP
Server: www.ietf.org (i.e. second terminal 20)
Request: GET/pub/WWW/TheProject.html HTTP/1.0.

The above indicated message is mapped over the TCP layer and then into IP packets, so as to form packets analogous to packet P-1 illustrated in FIG. 3 and wherein the protocol HTTP is indicated in field 451, the Request is indicated in data field 400 and the address corresponding to the server www.ietf.org is indicated in the destination IP address field 455.

The packets carrying the HTTP request message are intercepted (e.g., according to the destination address and the protocol type) by the router device 13, or by another enhanced router, which performs the above mentioned inspection step 505 and selection step 506 and forwards the packets to the HTTP Application Server AS1.

The HTTP Application Server AS1 reads all the HTTP Request and activates a service logic, triggered by the URI http://www.ietf.org, as indicated with reference to step 508 and performed by the trigger module 1-160 and by the service logic module 1-150. For example, service logic module 1-150 changes the content of the Request above indicated, changing the address of the web page to be retrieved on the same web server 20, in order to start an authorization procedure that requires a password. Then, the HTTP Application Server AS1 forwards the HTTP message back to the router device 13 which forwards the request to the final destination e.g., to the web server 20.

Another example of service logic applicable by one of the specific service logic modules 1-150-1-15M provided in the Application Server AS1 is a load-balancing logic, which allows to distribute HTTP requests between the web server 20 and at least a further server device (not shown in the figures).

In accordance with the second example, the user wants to establish a telephone communication on the communications system 200 with an agent of a call center. The telephone call on the IP-based communications system 200 is established, maintained and terminated employing the SIP (Session Initiation Protocol). SIP is a control protocol, belonging to the Application Layer of the TCP/IP model, for creating, modifying and terminating multimedia communication sessions with one or more participants. The service logic applied in this example relates to the selection of a particular agent among the ones available at the call center.

In greater detail, the user clicks on a link of a web page that triggers the start of a SIP Invite message from its terminal.

The SIP Invite message is carried by a packets flow which undergoes a processing path analogous to the one described for the HTTP message. Thus, the packets flow carrying the SIP Invite message is received by the router device 13, which performs the inspecting and selecting steps, identifying the SIP protocol and selecting the associated Application Server, such as the SIP Application Server AS2, which is dedicated to the processing of SIP messages. Thus, the router device 13 forwards packets P-1 carrying the Invite message to the SIP Application Server AS2.

The SIP Application Server AS2 reads the SIP Invite message and activates a service logic, triggered, for example, by the SIP URI destination of the telephone call. Particularly, service logic module 2-151 may replace the SIP URI indicated in the Invite message with a selected URI corresponding to a default agent. If the default agent is not available, as he is involved in another call, service logic module 2-151 may select the URI of another agent among a list of available agents URI. The list indicating the SIP URI and the availability status of the agents may be stored in a database, which can be looked up by the Application Server AS2 in accordance with the service logic applied.

The SIP Application Server AS2 returns to the router device 13 the packets flow P-2 carrying the SIP. Invite message with the called SIP URI modified as indicated above. The router device 13 forwards the modified message according to the normal routing on the communications system 200. Following the SIP Invite message the communication between the user of the first terminal 10 and the selected agent is established, maintained and terminated in accordance with conventional techniques.

The teachings of the present inventions allow to obtain a flexible inter-working between devices and resources operating at different layers of the model used to define and design the communication network such as, particularly, the Network layer an the Application layer of the ISO/OSI model. Particularly, the packet exchanges between the router device 13 and one of the selected Application Server AS1-ASN realizes a flexible inter-working since it avoids an enhancing of router with Application layer functions and gives the possibility of exploiting devices which are extremely flexible and fully dedicated to application services, such as the Application Servers.

Moreover, the teachings of the invention allow to reduce the complexity of the communication systems since, for example, the use of proxies is reduced and the communication systems in accordance with the invention can require only the configuration of routers, with the inspection and selection functions, and the implementing of the logic for processing the messages on the Application Servers.

The fact that, in accordance with the invention, the application logic is implemented in devices, such as the Application Servers, which are distinct from the networks devices, such as the routers, is an advantage since Application Servers are more flexible and easy to program than the proprietary processing nodes embedded in conventional routers.

The invention claimed is:

1. A communications method for a packet-switched network, comprising:
    a) receiving at a routing module operating in a low layer of a layered model defining communications on the network, a packet comprising an identifier associated with a protocol to be employed at a high layer of said model which is higher than said low layer;
    b) inspecting the received packet at an inspection module so as to identify the protocol associated with the identifier;

c) selecting at a selection module, a first device operating in said high layer associated with the identified protocol;
d) sending the packet toward the first device;
e) processing said packet by applying at the first device a procedure of the high layer to produce a processed packet, said processed packet being different from said packet;
f) sending the processed packet from the first device back to the routing module; and
g) transmitting the processed packet from the routing module toward the network.

2. The communications method according to claim 1, wherein said high layer is configured to be mapped on an application layer of the International Standard Organization/Open Systems Interconnection model.

3. The communications method according to claim 2, wherein said routing module operates in a network layer of the International Standard Organization/Open Systems Interconnection model or is configured to be mapped thereon.

4. The communications method according to claim 1, wherein said routing module, said inspection module and said selection module are in a second device operating in the low layer.

5. The communications method according to claim 4, wherein said second device is a network router.

6. The communications method according to claim 1, wherein inspecting the packet comprises:
accessing a header of said packet containing said identifier.

7. The communications method according to claim 6, wherein said packet comprises an internet protocol-datagram and said identifier is representative of a service type protocol.

8. The communications method according to claim 7, wherein said service type protocol comprises at least one of the following: hyper text transfer protocol, hyper text transfer protocol secure socket layer, session initiation protocol; file transfer protocol, teletypewriter network, simple mail transfer protocol, post office protocol, simple network management protocol, and simple object access protocol.

9. The communications method according to claim 1, wherein inspecting the packet comprises applying one of the following inspection techniques: stateful packet inspection, and deep packet inspection.

10. The communications method according to claim 1, further comprising, before applying the procedure:
accessing, at the first device, information in said packet which triggers the application of the procedure.

11. The communications method according to claim 1, further comprising:
generating at least part of the packet by means of a first terminal; and
transmitting the at least part of the packet on the network by said first terminal.

12. The communications method according to claim 11, wherein said packet comprises a destination address of a second terminal to which at least a part of the packet has to be delivered.

13. The communications method according to claim 11, wherein said packet comprises data representing at least part of a message in accordance with said protocol.

14. The communications method according to claim 12, wherein the first terminal is a client terminal and the second terminal is a server terminal.

15. A packet-switched network comprising:
at least one processor device capable of operating in a high layer of a layered model defining communications on said network and capable of being configured for applying respective procedures to packets;
a routing module operating in a low layer of said model which is lower than said high layer, the routing module capable of being adapted to receive the packets comprising a respective identifier of a corresponding protocol to be employed at the high layer;
an inspection module capable of being adapted to inspect a packet so as to identify the protocol associated with the identifier; and
a selection module capable of being adapted to select, on the basis of said identifier, a first device associated with the identified protocol and capable of being configured to apply a procedure of the high layer to the packet for producing a processed packet, the processed packet being different from the packet;
the routing module capable of being further configured to transmit the packet to the selected first device, receive the processed packet from the first device and transmit the processed packet on the network.

16. The packet-switched network according to claim 15, wherein said high layer can at least be mapped on an application layer of the International Standard Organization/Open Systems Interconnection model.

17. The packet-switched network according to claim 16, wherein the first device is capable of operating in a network layer of the International Standard Organization/Open Systems Interconnection model or can be mapped thereon.

18. The packet-switched network according to claim 17, wherein the routing module, the inspection module and the selecting module are in a second device operating in the low layer.

19. The packet-switched network according to claim 18, wherein said second device is a network router.

20. The packet-switched network according to claim 15, wherein said first device comprises at least one service module which is capable of being configured to apply the procedure.

21. The packet-switched network according to claim 15, wherein said inspecting module is capable of being configured to assess a header of said packet containing said identifier.

22. The packet-switched network according to claim 21, wherein said packet comprises an internet protocol-datagram and said identifier is representative of a service type protocol.

23. The packet-switched network according to claim 20, wherein said first device further comprises a trigger module for accessing information in said packet which triggers the at least one service logic module.

24. The packet-switched network according to claim 15, further comprising a first terminal for generating at least part of said packet and transmitting the at least part of said packet on the network.

25. The packet-switched network according to claim 15, further comprising a second terminal to which the packet has to be delivered.

26. The packet-switched network according to claim 25, wherein said packet comprises data representing at least part of a message in accordance with said protocol.

27. The packet-switched network according to claim 24, wherein the first terminal is a client terminal and a second terminal to which the packet has to be delivered, is a server terminal.

* * * * *